US006839048B2

(12) United States Patent
Park

(10) Patent No.: US 6,839,048 B2
(45) Date of Patent: Jan. 4, 2005

(54) LCD WITH ADAPTIVE LUMINANCE INTENSIFYING FUNCTION AND DRIVING METHOD THEREOF

(75) Inventor: Cheol-Woo Park, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 262 days.

(21) Appl. No.: 10/097,501

(22) Filed: Mar. 15, 2002

(65) Prior Publication Data

US 2002/0130830 A1 Sep. 19, 2002

(30) Foreign Application Priority Data

Mar. 15, 2001 (KR) ........................................ 2001-13309

(51) Int. Cl.[7] .................................................. G09G 3/36
(52) U.S. Cl. .......................................... 345/102; 345/89
(58) Field of Search ............................ 345/82–107, 690

(56) References Cited

U.S. PATENT DOCUMENTS 5,812,149 A * 9/1998 Kawasaki et al. ............ 345/98
5,915,040 A * 6/1999 Yatomi et al. ............... 382/232
6,111,559 A * 8/2000 Motomura et al. ......... 345/102
6,359,389 B1 * 3/2002 Medina et al. ........... 315/169.1

FOREIGN PATENT DOCUMENTS

JP 10187127 7/1998 ............ G09G/5/14
JP 2000-125163 * 4/2000 .......... H04N/5/225
KR 1020010003716 1/2001 ............ G09G/3/30

* cited by examiner

*Primary Examiner*—Alexander Eisen
(74) *Attorney, Agent, or Firm*—McGuireWoods LLP

(57) ABSTRACT

Disclosed is an LCD having an adaptive luminance intensifying function and driving method thereof. A timing controller checks features of externally provided image data, and when they are found to be moving pictures, it determines a luminance level required from the image data and outputs a luminance level control signal, and when they are found to be still images, outputs a predetermined luminance signal. A backlight driver outputs a high-potential backlight driving voltage to the backlight unit when a luminance control signal of high-luminance level driving is provided by the timing controller, and outputs a constant level luminance signal when a constant luminance signal is input. As a result, by selecting a plurality of portions of the displayed screen and tracking and monitoring the changes of the image data, features of the images are defined and application conditions of the luminance intensifying function are determined to control the luminance level of the backlight and outputs of gamma voltage levels. Accordingly, the contrast of a display screen is improved and the power consumption is

23 Claims, 8 Drawing Sheets

LCD WITH ADAPTIVE LUMINANCE INTENSIFYING FUNCTION AND DRIVING METHOD THEREOF

BACKGROUND OF THE INVENTION (a) Field of the Invention

The present invention relates to a liquid crystal display (LCD) and a driving method thereof. More specifically, the present invention relates to an LCD with an adaptive luminance intensifying function for modifying the luminance of a back light according to images provided on the LCD, and a driving method thereof.

(b) Description of the Related Art

In general, as to features of a cold cathode fluorescent lamp (CCFL) used for a light source in an LCD, its luminance is inversely proportional to its lifetime. That is, if the CCFL is driven with a high current to increase the luminance, its lifespan is reduced, and if the CCFL is driven at a low current to increase its lifetime, it is difficult to obtain high luminance. However, actual commercial products generally require high luminance and a long lifetime concurrently.

To satisfy these dual requirements, an LCD panel generally is driven at a predetermined level of luminance, and in the case of driving a screen that requires a specific high luminance, a high current is temporarily provided to a backlighting lamp so as to increase active regions of the luminance of a display element.

Also, the current used by the display elements is varied according to images displayed on the LCD screen. For example, in the case of a normally white mode wherein liquid crystal molecules are rearranged in the electric field direction when the voltage is provided and incident rays are isolated, when the number of bright pixels on the screen is increased, the power consumed by the panel is reduced, and when the number of dark pixels on the screen is increased, the power consumed by the panel is increased. A method for controlling the current of the lamp according to the power consumed by the panel mainly uses this feature.

The above-noted technique, requires an additional circuit for detecting the current consumed by the panel and modifying the current to fit a variation range of a luminance control signal of a back light driving inverter.

Also, since the luminance of all the screen is controlled, much power is used compared to only controlling the luminance of a needed screen portion.

SUMMARY OF THE INVENTION

It is an object of the present invention to provide an LCD having an adaptive luminance intensifying function for controlling the luminance of a back light according to gray levels of displayed image data.

In one aspect of the present invention, an LCD comprises: an LCD panel comprising a plurality of gate lines, a plurality of data lines, switches connected to the gate lines and data lines, and pixel electrodes connected to the switches and being responsive to operations of the switches; a scan driver for sequentially outputting scan signals to the gate lines; a data driver for outputting image signals to the data lines; an inverter for outputting a predetermined backlight driving voltage; a backlight unit, provided on a rear portion of the LCD panel, for outputting predetermined rays when the backlight driving voltage is supplied; and a timing controller for receiving image signals and timing signals from the outside, converting them into signals for outputs of the image signals and scan signals, respectively outputting them to the data driver and the scan driver, checking the image signals, and when the image signals are found to be moving pictures, outputting a high or a low voltage to the inverter according to whether the image signals require high or low luminance level driving so as to increase or decrease luminance levels of the LCD panel, and when the image signals are found to be still images, outputting a control signal of outputs of a predetermined luminance level.

In another aspect of the present invention, in a method for driving a liquid crystal display (LCD) comprising an LCD module for including an LCD panel and a backlight unit, a scan driver for outputting scan signals to the LCD panel, and a data driver for outputting image signals to the LCD panel, an LCD driving method comprises: (a) setting a plurality of cells; (b) storing first data respectively corresponding to the cells at a k-th frame input from the outside; (c) storing second data respectively corresponding to the cells at a (k+N)th frame after an N-th frame is passed, comparing the first data with the second data, and when they are matched, setting a first value, and when they are different, setting a second value, and computing a plurality of first comparison values; (d) setting an input screen to be a moving picture mode when all the first comparison values are the second value; (e) checking whether a number of the first comparison values that are the second value is greater than a predetermined integer when one of the first comparison values is not the second value; (f) setting the input screen to the moving picture mode when the number of the first comparison values that is the second value is greater than a predetermined integer, and setting the input screen to a still image mode when the number of the first comparison values that are the second value is less than the predetermined integer; (g) activating the adaptive luminance intensifying function for controlling luminance of the backlight according to gray levels of the image data displayed for each image frame when the input images are set to be the moving picture mode, and outputting the image data in the previous steps (d) or (f); and (h) deactivating the adaptive luminance intensifying function and outputting the image data according to a predetermined reference luminance level when the input images are set to be the still image mode in the previous step (f).

Methods according to the present invention advantageously may provide adaptive luminance intensifying, and adaptive luminance intensifying may be provided using methods, products and systems of the invention.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
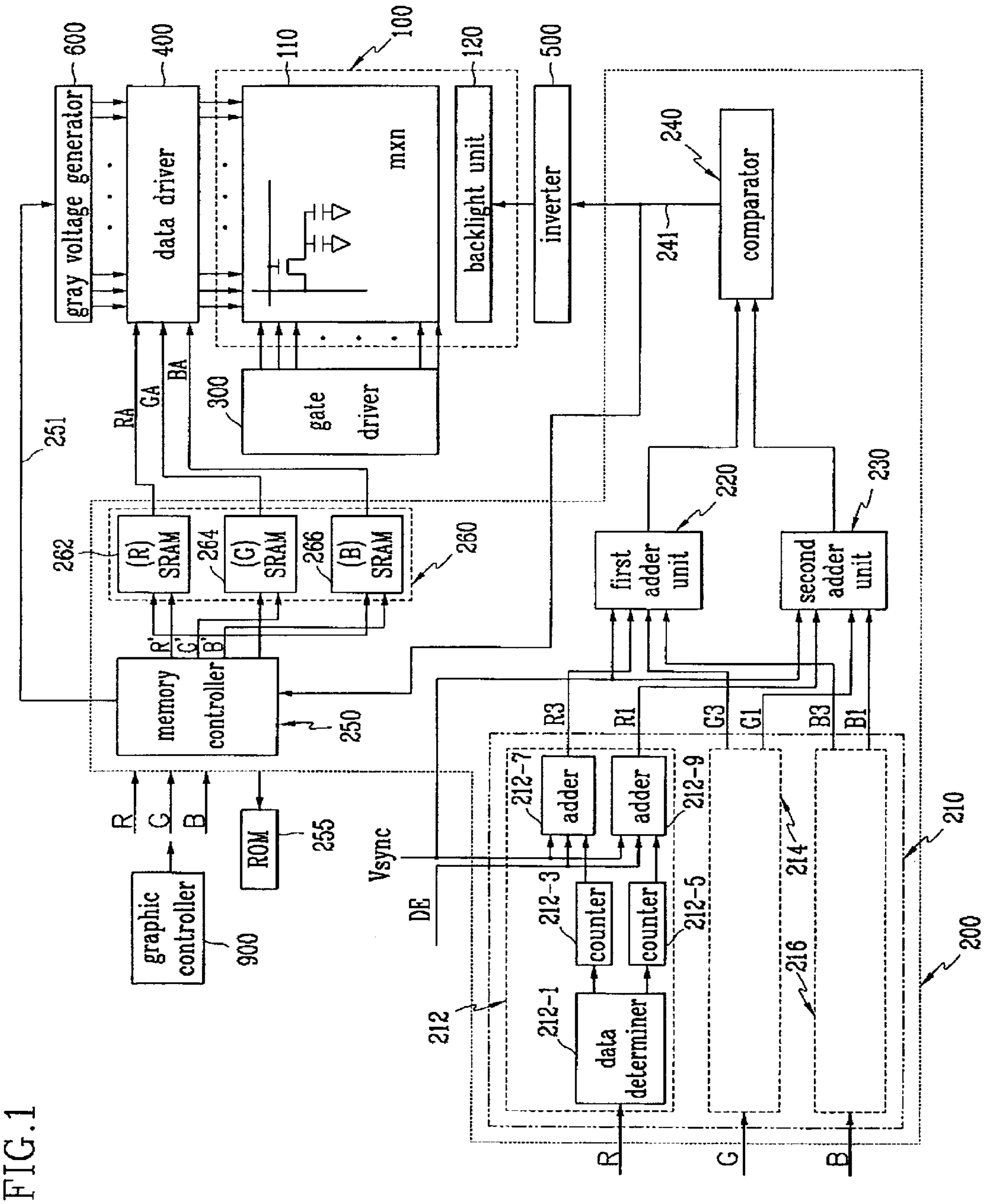
FIG. 1 shows a diagram of an LCD having an adaptive luminance intensifying function according to a first preferred embodiment of the present invention.

FIG. 1 shows an LCD having an adaptive luminance intensifying function according to a first preferred embodiment of the present invention.

As shown, the LCD having an adaptive luminance intensifying function comprises an LCD driver that comprises: an LCD unit 100 including an LCD panel 110 and a backlight unit 120; a timing controller 200; a gate driver 300; a data driver 400; a backlight inverter 500; and a gray voltage generator 600.

The LCD panel 110 comprises a plurality of pixel electrodes of an (m×n) matrix type. As gate voltages (or scanning signals) G1 to Gn provided by the gate driver 300 are provided to corresponding pixels, the LCD panel drives the corresponding built-in pixel electrodes in response to data voltages (or pixel signals) D1 to Dm provided by the data driver 400, and displays the images according to the light source emitted by the backlight unit 120.

The timing controller 200 comprises a data counter 210; a first adder unit 220; a second adder unit 230; a comparator 240; a memory controller 250; and an SRAM unit 260. In connection with the description of the first preferred embodiment, the timing controller 200 divides the respective RGB gray data into three gray level groups for each frame and counts the data in the frame.

In the case image data of a bright gray level are input to a counted single frame, the timing controller 200 provides a driving voltage greater than a normal driving voltage to the backlight inverter 500 to increase the luminance.

Also, in the case image data of a dark gray level are input to a counted single frame, the timing controller 200 provides a normal driving voltage to the backlight inverter 500 so as to maintain the luminance, and adjusts the gray level voltage provided to the LCD unit 100 to generate a darker luminance level.

In detail, the data counter 210 comprises: an R data counter 212; a G data counter 214; and a B data counter 216, each of which includes a data determiner, a first counter, a second counter, a first adder and a second adder (not all of which are illustrated). The data counter 210 counts the number of the respective R, G and B gray data provided by an external graphic controller (900), counts high level R, G and B gray data R3, G3 and B3 and outputs count results to the first adder unit 220, and counts low level gray data R1, G1 and B1 and outputs counts to the second adder unit 230.

The preferred embodiment of the present invention will now be described in detail by selecting the R data counter 212 including a data determiner 212-1, a first counter 212-3, a second counter 212-5, a first adder 212-7 and a second adder 212-9 as an example.

The data determiner 212-1 checks a gray level of input R image data, and in the case the gray level is found to be high, the data determiner 212-1 provides the high gray level R data to the first counter 212-3, and in the case the gray level is found to be low, the data determiner 212-1 provides the low gray level R data to the second counter 212-5.

The first counter 212-3 receives the high gray level R data from the data determiner 212-1, counts the high gray level data and provides the counted number to the first adder 212-7, and the second counter 212-5 receives the low gray level R data from the data determiner 212-1, counts the low gray level data and provides the counted number to the second adder 212-9.

The first adder 212-7 receives the count number from the first counter 212-3, adds the amount of high level R data of each frame in response to a single vertical sync signal Vsync and outputs addition results to the first adder unit 220, and the second adder 212-9 receives the count number from the second counter 212-5, adds the amount of low level data R data of each frame in response to a single vertical sync signal Vsync and outputs addition results to the second adder unit 230.

The first adder unit 220 receives the numbers of the respective high gray level R, G and B image data of each frame from the data counter 210, adds them and provides results to the comparator 240, and the second adder unit 230 receives the numbers of the respective low gray level R, G and B image data of each frame from the data counter 210, adds them and provides results to the comparator 240.

The comparator 240 compares the numbers of the respective high gray level R, G and B image data input from the first adder unit 220 with those of the respective low gray level R, G and B image data input from the second adder unit 230 for each frame, and in the case in which the amount of the respective high gray level R, G and B image data is greater than the amount of the respective low gray level R, G and B image data, the comparator 240 outputs a luminance control signal 241 for providing a high driving voltage to the backlight inverter 500 to increase the luminance. Also, in the opposite case (in which the amount of the respective high gray level R, G and B image data is less than the amount of the respective low gray level R, G and B image data), the comparator 240 outputs a luminance control signal for providing a normal driving voltage to the backlight inverter 500.

In the above-noted case of outputting the luminance control signal 241 for providing the normal driving voltage, the comparator 240 outputs the luminance control signal to the memory controller 250 for converting low gray data into lower gray data so as to compensate for the increase of the backlight.

The memory controller 250 provides the respective R, G and B image data provided by the graphic controller (900) to the SRAM unit 260. In the case that image data of a predetermined range are displayed, the memory controller 250 extracts the low gray R, G and B image data from a ROM 255 and outputs the same (R', G' and B') to the SRAM unit 260 so as to compensate for the increase of the backlight. In this preferred embodiment shown in FIG. 1, the ROM 255 used as a lookup table (LUT) is installed on the outside of the timing controller 200, and the ROM can also be installed inside of the timing controller 200.

The SRAM unit 260 comprises a first SRAM 262 for storing R data; a second SRAM 264 for storing G data; and a third SRAM 266 for storing B data, with all such data being provided by the memory controller 250. The SRAM unit 260 receives the R, G and B image data R', G' and B' from the memory controller 250 and provides adaptive R, G and B image data RA, GA and BA to the data driver 400.

In the case that a luminance control signal 241 of a low gray level is input by the comparator 240, the memory controller 250 outputs a control signal 251 to the gray voltage generator 600 for converting the low gray data into lower gray data so as to compensate for the increase of the backlight.

The gray voltage generator 600 generates gray data according to the bit number of the R, G and B data provided by the external graphic controller, and provides the same to the data driver 400; and the gate driver 300 enables the data provided by the data driver 400 to be transmitted to the pixels. In the case a control signal 251 for converting into low gray is input by the memory controller 250 of the timing controller, 200, the gray voltage generator 600 generates a gray signal lower than the normal gray signal and outputs the same to the data driver 400.

The data driver 400, also referred to as a source driver, receives adaptive R, G and B image data RA, GA and BA from the timing controller 200, stores the image data RA, GA and BA in a shift register (not illustrated), and when a signal LOAD for instructing to load data on the LCD panel 110 is input, the data driver 400 selects voltages corresponding to the respective image data RA, GA and BA and transmits the selected voltages to the LCD panel 110.

As described above, at the time of driving the backlight of the LCD, contrast of displayed images can be improved by increasing the luminance of the backlight in the case of a screen that partially requires high contrast ratio or a screen that wholly requires high brightness and by normally maintaining the luminance in other cases.

An operation of an LCD having an adaptive luminance intensifying function according to the present invention will be described.

Figure 2:
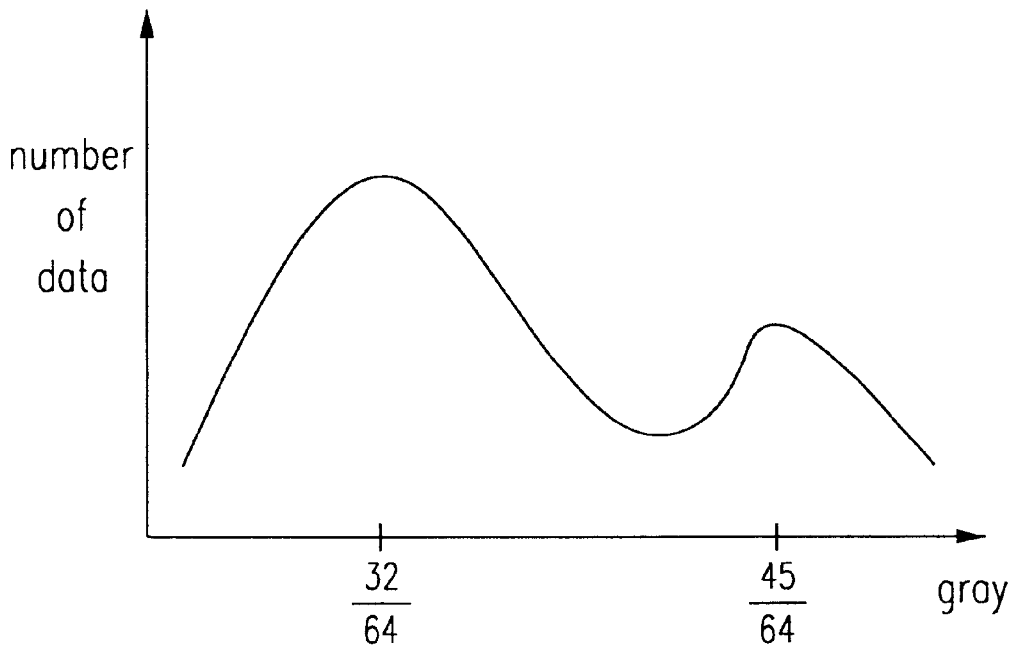
FIG. 2 shows a graph for describing the amount of general data by gray level.

FIG. 2 shows a general graph of a data amount by gray level.

As shown, gray distribution of the images can be easily determined by counting the amount of data over a first predetermined gray level (e.g., 45/64 gray) and the amount of data below a second predetermined gray level (e.g., 32/64 gray) and comparing them. In this instance, the 45/64 gray or the 32/64 gray represents that the each luminance is ½ or ¼ times the maximum luminance when the gamma value of the display is set to be two.

In an image determining method for increasing the luminance, in the case that the amount of data over the 45/64 gray level is greater than 5% or 3% of all the data and ten times the amount of data over the 32/64 gray level, the luminance of the backlight and the gray level of the low gray data are converted.

A method for driving the luminance of the backlight in four steps by modifying the luminance according to driven images will now be described.

Figure 3:
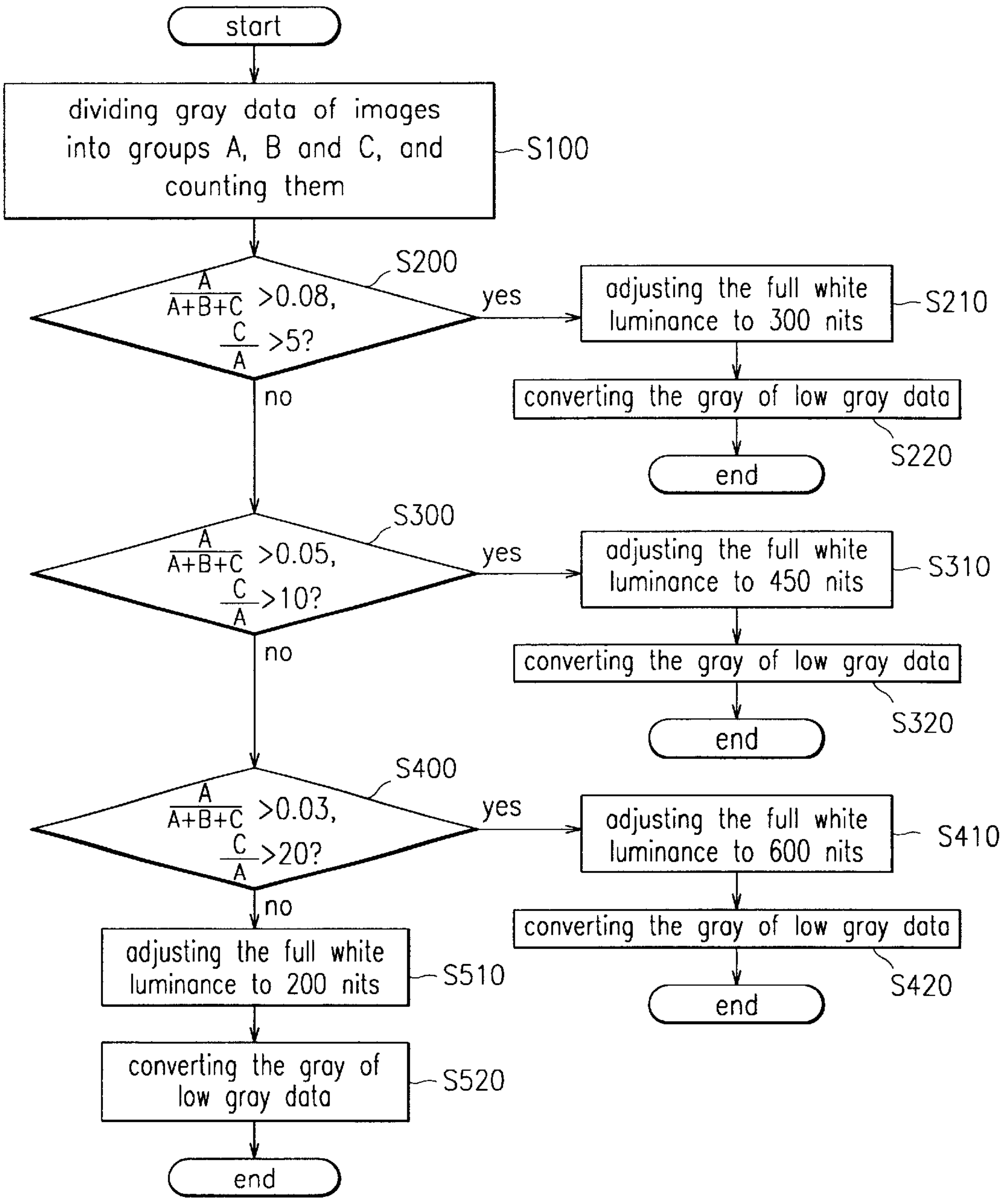
FIG. 3 shows a flowchart for an LCD displaying method having an adaptive luminance intensifying function according to the first preferred embodiment of the present invention.

FIG. 3 shows a flowchart for displaying an image on an LCD having an adaptive luminance intensifying function according to a preferred embodiment of the invention will be described.

As shown, the gray data of the image are categorized as group A for data over the 45/64 gray level, group B for the data between 45/64 and 32/64 and group C for the data below the 32/64 gray level, and the amount of gray data in each group is counted in step S100.

It is checked whether A/(A+B+C) is greater than 0.08 and C/A is greater than 5 in step S200, and when these conditions are satisfied, lamp current of the backlight or a ratio of the on/off duty of the lamp current is controlled to make the full white luminance be 300 nits (or cd/m2) in step S210, and the gray level of the low gray data is converted in step S220.

In the case that the conditions of the previous step S200 are not satisfied, it is checked whether A/(A+B+C) is greater than 0.05 and C/A is greater than 10 in step S300, and when these conditions are satisfied, the lamp current of the backlight or a ratio of the on/off duty of the lamp current is controlled to make the full white luminance be 450 nits in step S310, and the gray level of the low gray data is converted in step S320.

In the case that the conditions of the previous step S300 are not satisfied, it is checked whether A/(A+B+C) is greater than 0.03 and C/A is greater than 20 in step S400, and when these conditions are satisfied, the lamp current of the backlight or a ratio of the on/off duty of the lamp current is controlled to make the full white luminance be 600 nits in step S410, and the gray level of the low gray data is converted in step S420.

In the case the conditions of the previous step S400 are not satisfied, the lamp current of the backlight or a ratio of the on/off duty of the lamp current is controlled to make the full white luminance be 200 nits in step S510, and the gray level of the low gray data is converted in step S520.

As described above, the gray data of the images are divided into groups A (over 45/64 gray), B (between 45/64 and 32/64 gray) and C (below 32/64 gray), the amount of gray data in each group is counted, the counted=numbers for A, B and C are compared, the luminance is controlled in four steps, and the luminance states are controlled.

In an actual LCD panel, when the luminance of the backlight is increased, the luminance of the pixels of low gray levels is concurrently increased. Hence, their gray levels must be significantly lowered to maintain the luminance that is identical to when the backlight does not increase the luminance. By this gray modification, a dynamic range of the backlight is increased.

Figure 4:
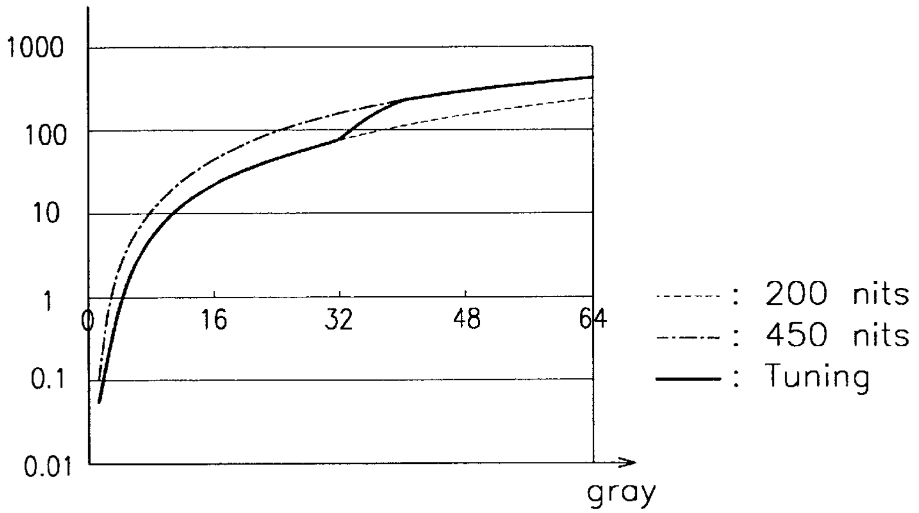
FIG. 4 shows a graph of gray level vs. luminance before and after tuning according to the preferred embodiment of the present invention.
Figure 5:
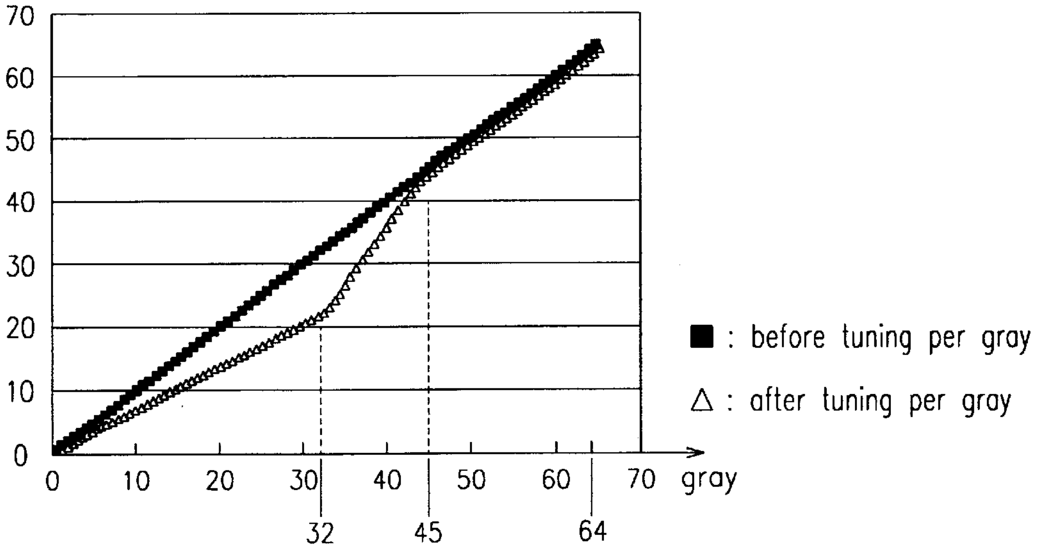
FIG. 5 shows a graph of a gray level tuning by consideration of luminance changes of back light according to the preferred embodiment of the present invention.

Referring to FIGS. 4 and 5, the second step S310 (in the case the luminance is set to be 450) of the gray modification example of FIG. 3 will be described.

FIG. 4 shows the luminance of each gray level before and after tuning. That is, FIG. 4 shows the luminance of each gray level when the luminance of the backlight is adjusted to the panel luminance of 200 and 450 nits, and the luminance of each gray level when the gray is tuned, in the case no gray modification is performed on the LCD panel.

As shown, even when the luminance of the backlight becomes brighter, the luminance identical with that before the luminance becomes brighter is implemented at the low gray level.

FIG. 5 shows gray level tuning by consideration of luminance modifications of the backlight.

As shown, the contrast when displaying the images can be increased by making a bright portion brighter and uniformly maintaining the luminance of a dark portion.

That is, the contrast at 200 nits is 350~400:1, but the effective contrast when implementing the actual moving pictures is 1000:1 at the maximum.

As described above, since a predetermined amount of the image data is generally concentrated at the high gray level and most image data is at the low gray level, the generation of the luminance of the high backlight is controlled to highlight the images of the above-noted predetermined amount of data at the high gray level. Concurrently, as to the low gray image data, the data are modified to a gray level lower than the original gray level, and hence the luminance of the high backlight is compensated.

In the above-described case of the image data that have a continuous gray distribution, there is no need to increase the luminance of the backlight when the power consumption is high or low.

Also, in the case of transmitting a luminance control signal to a backlight inverter via a simple computation of digital data, since an additional circuit is not necessary, no further cost is incurred.

As described above, the preferred embodiment is very effective when displaying moving TV and DVD pictures on the LCD. However, expensive LCD TV sets can generally be used for both PC televisions and PC monitors. When the LCD TV that uses the digital adaptive luminance intensifying function according to the preferred embodiment is used as a monitor, problems may occur. For example, when a user writes a document or navigates the web using the above-noted LCD TV, excessive high luminance is generated, user's eyes become tired, and severe changes of the luminance levels of the LCD screen are generated. To solve these problems, the user conventionally has been required to manually manipulate the digital adaptive luminance intensifying function.

Accordingly, in a second preferred embodiment of the invention, characteristics of externally input image signals are analyzed, and it is determined whether the input images are moving picture signals for the TV, video signal player or DVD player, or still images for a monitor.

Generally, since the image signals for the TV and video players are media generated by capturing real images with a camera, converting them into analog or digital signals and transmitting or recording them, even when the images of a predetermined portion of each frame of the images are converted into the analog or digital signals, minor changes are generated.

Also, signals of still images are made using digital signals, and when the still images are displayed on a digital signal-processing medium such as an LCD monitor, their gray levels have identical values up to minute levels when the user does not manually change the images.

Figure 6:
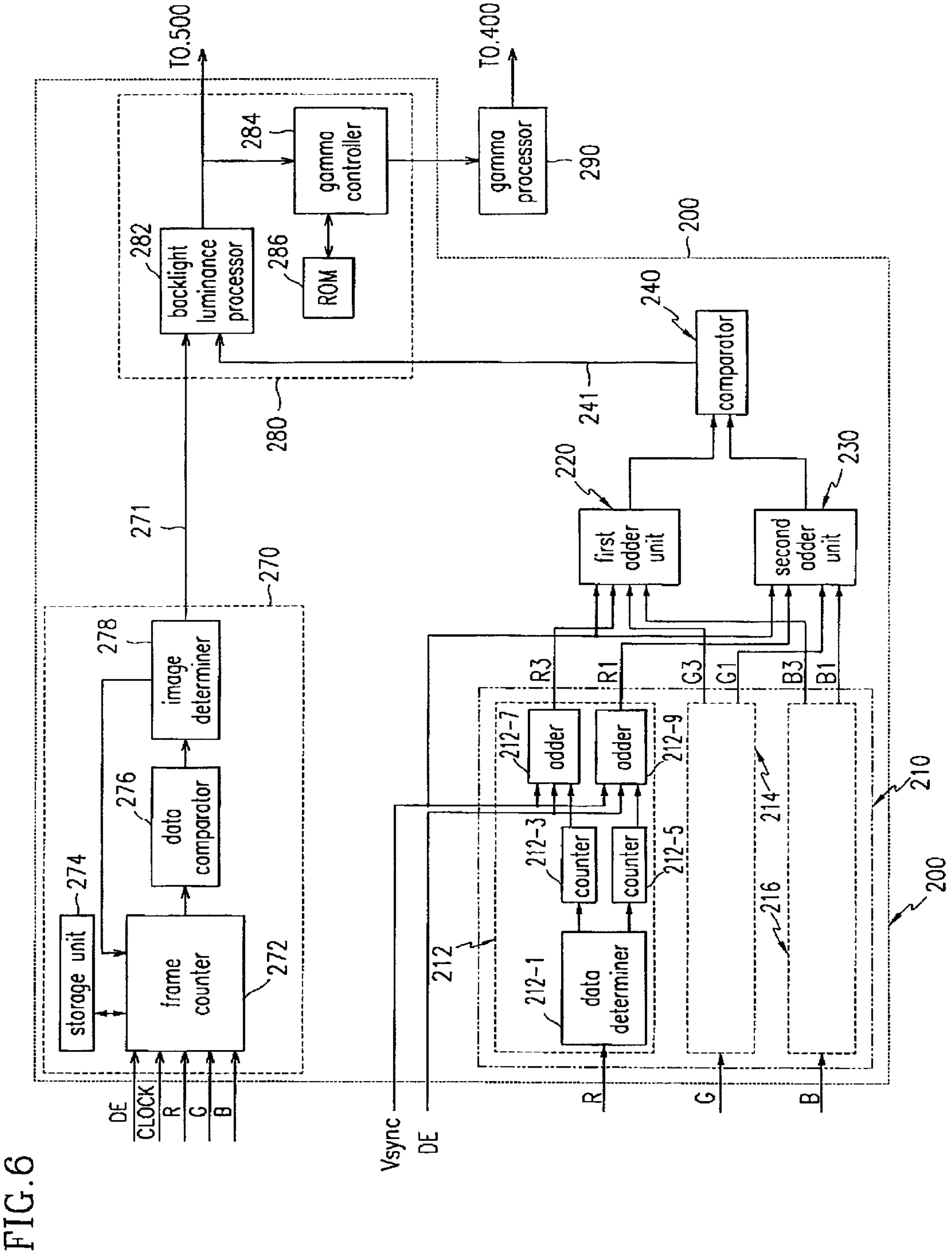
FIG. 6 shows a diagram of an LCD having an adaptive luminance intensifying function according to a second preferred embodiment of the present invention.
Figure 7:
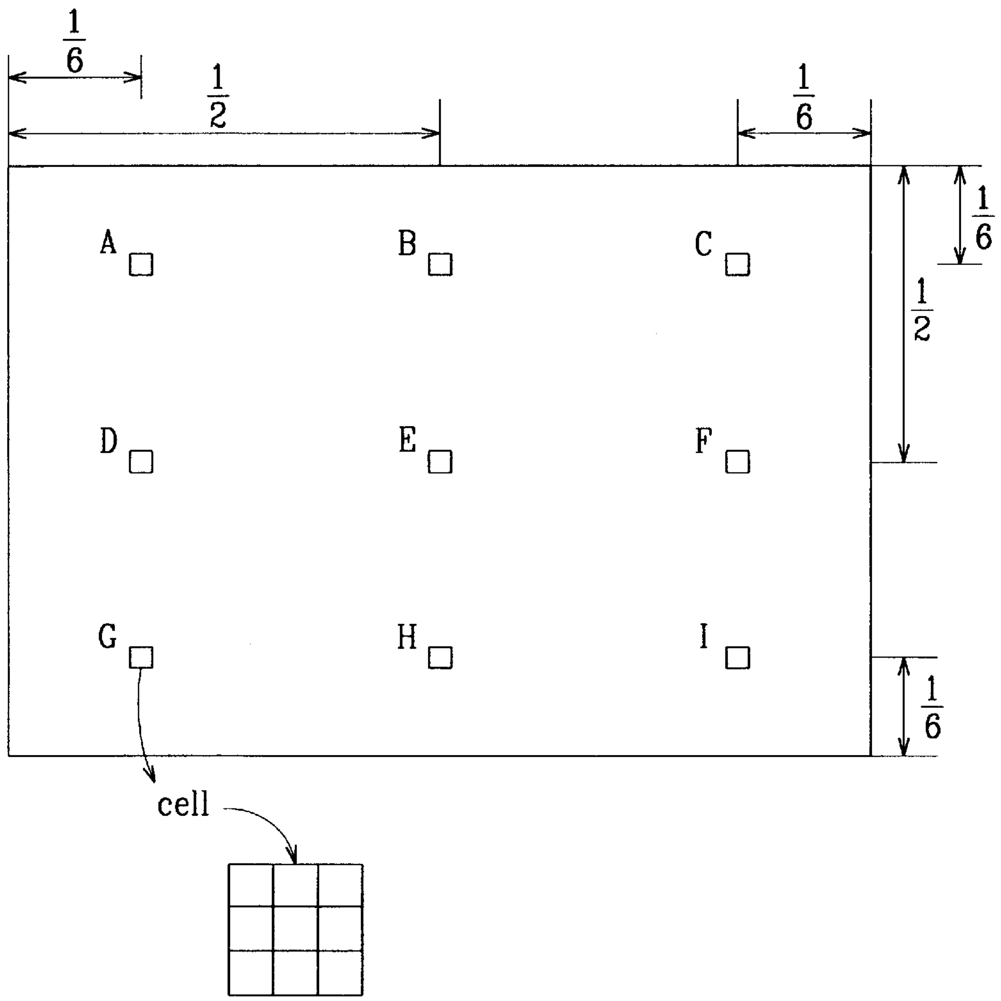
FIG. 7 shows a diagram for describing a cell established according to the preferred embodiment of the present invention.

FIG. 6 shows an LCD having an adaptive luminance intensifying function according to the second preferred embodiment, and FIG. 7 shows a cell established according to the present invention.

Referring to FIG. 6, the timing controller 200 comprises a data counter 210; a first adder unit 220; a second adder unit 230; a comparator 240; an image referrer 270; and a luminance controller 280. Components that have functions identical with those of FIG. 1 have identical reference numerals and no corresponding description will be repeated.

The image referrer 270 comprises a frame counter 272, a storage unit 274, a data comparator 276, and an image determiner 278, and the image referrer 270 checks whether the input image data are moving pictures or still images and outputs different image determination signals 271 according to the checking results.

In detail, the frame counter 272 receives image data of a k-th frame from the outside, extracts first data corresponding to a plurality of cells and stores them in the storage unit 274, and when the image data of a (k+N)th frame are input, the frame counter 272 extracts second data corresponding to the cells and stores them in the storage unit 274, and then provides the first and second data to the data comparator 276.

Here, as shown in FIG. 7, a single cell is a 3×3 pixel block, and it is preferable for the cells to comprise a first point E corresponding to the center portion of a screen, a second point B corresponding to the top center portion of the screen, a third point H corresponding to the bottom center portion of the screen, a fourth point D corresponding to the left center portion of the screen and a fifth point F corresponding to the right center portion of the screen among the image data to be displayed on the LCD panel.

Also, the cells can further comprise a sixth point A corresponding to the top left portion of the screen, a seventh point C corresponding to the top right portion of the screen, an eighth point G corresponding to the bottom left portion of the screen, and a ninth point I corresponding to the bottom right portion of the screen.

The positions of the pixel blocks are provided on ⅙ or ½ portions of the screen with respect to the top, bottom, left or right of the screen, and the present invention is not restricted to these values.

The storage unit 274 comprises memories and registers, and receives respective image data corresponding to the cells from the frame counter 272 and stores them.

The data comparator 276 receives the first and second data from the frame counter 272, compares them and provides a first or a second signal for data comparison to the image determiner 278. For example, in the case the first and second data are found to be identical after comparing the image data corresponding to predetermined cells, the first signal is set to be ‘0’ and is output, and in the case they are found to be different, the second signal is set to be ‘1’ and is output. The first and second signals can have other values besides ‘0’ and ‘1’.

When ‘0’ is input as the first signal by the data comparator 276, the image determiner 278 determines that the image is a still image and outputs a first image determination signal to the luminance controller 280, and when ‘1’ is input as the second signal, the image determiner 278 determines that the image is a moving picture and outputs a second image determination signal to the luminance controller 280.

The luminance controller 280 comprises a backlight luminance processor 282, a gamma controller 284 and a ROM 286, and it outputs a backlight level control signal corresponding to a backlight luminance signal and a gamma voltage control signal based on the first or second image determination signal.

In detail, when receiving the first image determination signal from the image referrer 270, the backlight luminance processor 282 outputs a first control signal according to the backlight luminance signal to the backlight inverter 500 (as in FIG. 1), and when receiving the second image determination signal from the image referrer 270, the backlight luminance processor 282 outputs a second control signal with no relation to the backlight luminance signal to the backlight inverter 500 (of FIG. 1).

The gamma controller 284 outputs a modified gamma voltage when the first control signal is input, and extracts a gamma voltage from the ROM 286 that stores predetermined gamma voltages and outputs the gamma voltage to the gamma processor 290.

The gamma processor 290 receives the modified gamma voltage or the predetermined gamma voltage from the gamma controller 284 and provides the same to the data driver 400 (see FIG. 1). In FIG. 6, the gamma processor 290 is separately provided from the timing controller 200, but the gamma processor can also be included in the timing controller 200.

As described above, the image data are checked, and when they are found to be still images, it may mean that the LCD is being used as a monitor, and therefore the luminance intensifying function is stopped, and a predetermined luminance signal according to an external reference signal or a self-established predetermined luminance signal is constantly provided to output stable screen shots, reduce power consumption and maintain screen contrast.

Also, in the case the input image data are found to be moving pictures, it may mean that the LCD is being used for a TV, a video player or DVD player, and hence the luminance intensifying function is activated and the screen contrast is maintained.

In this instance, a method for checking whether the image data are still images or moving pictures is to divide a single frame into a plurality of cells, and compare data signals for each frame with an equivalent interval.

The method for checking the states of the input image data will now be described in detail.

Figure 8A:
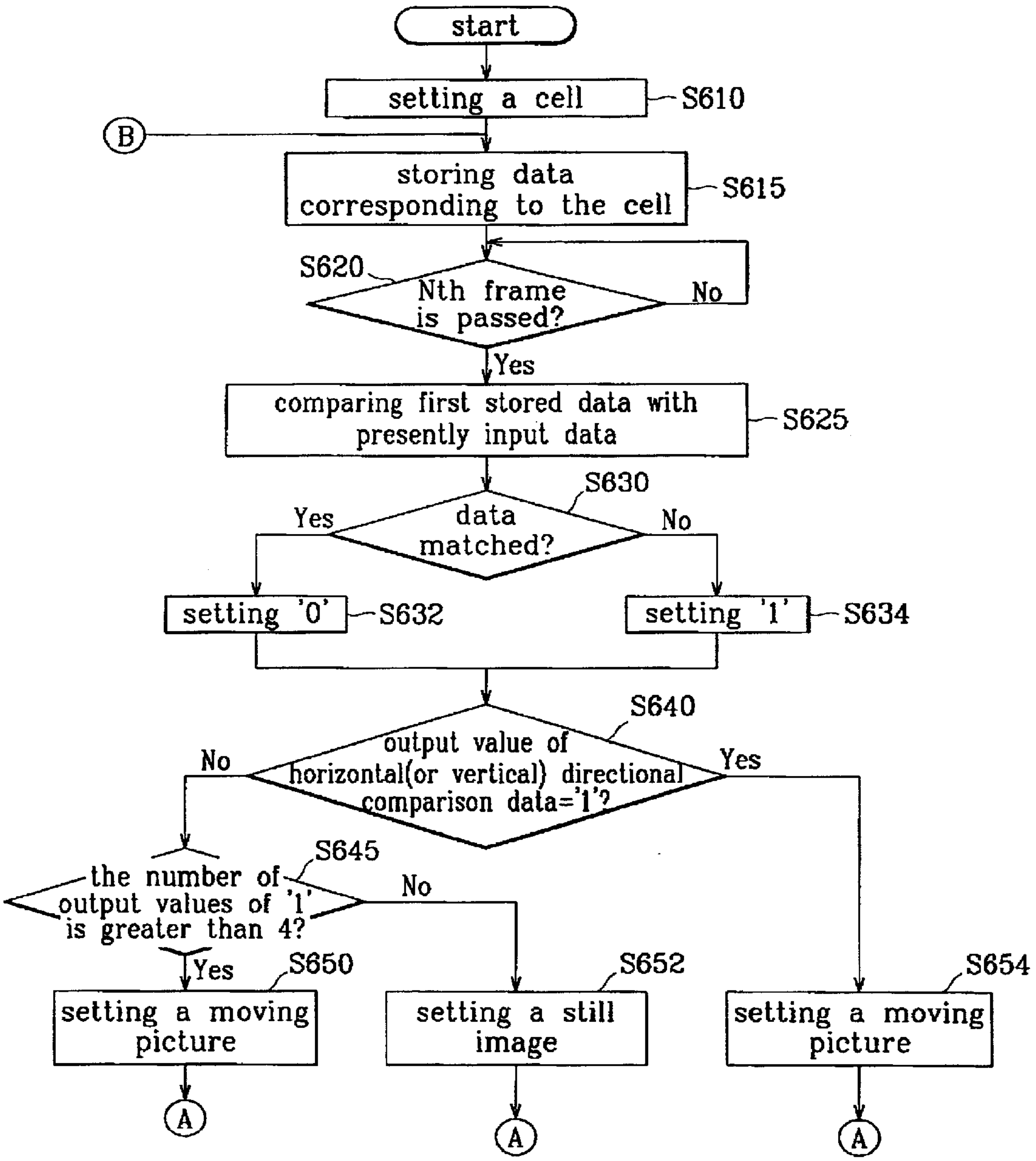
FIGS. 8A and 8B show flowcharts for describing a driving method of an LCD having an adaptive luminance intensifying function according to the second preferred embodiment of the present invention.
Figure 8B:
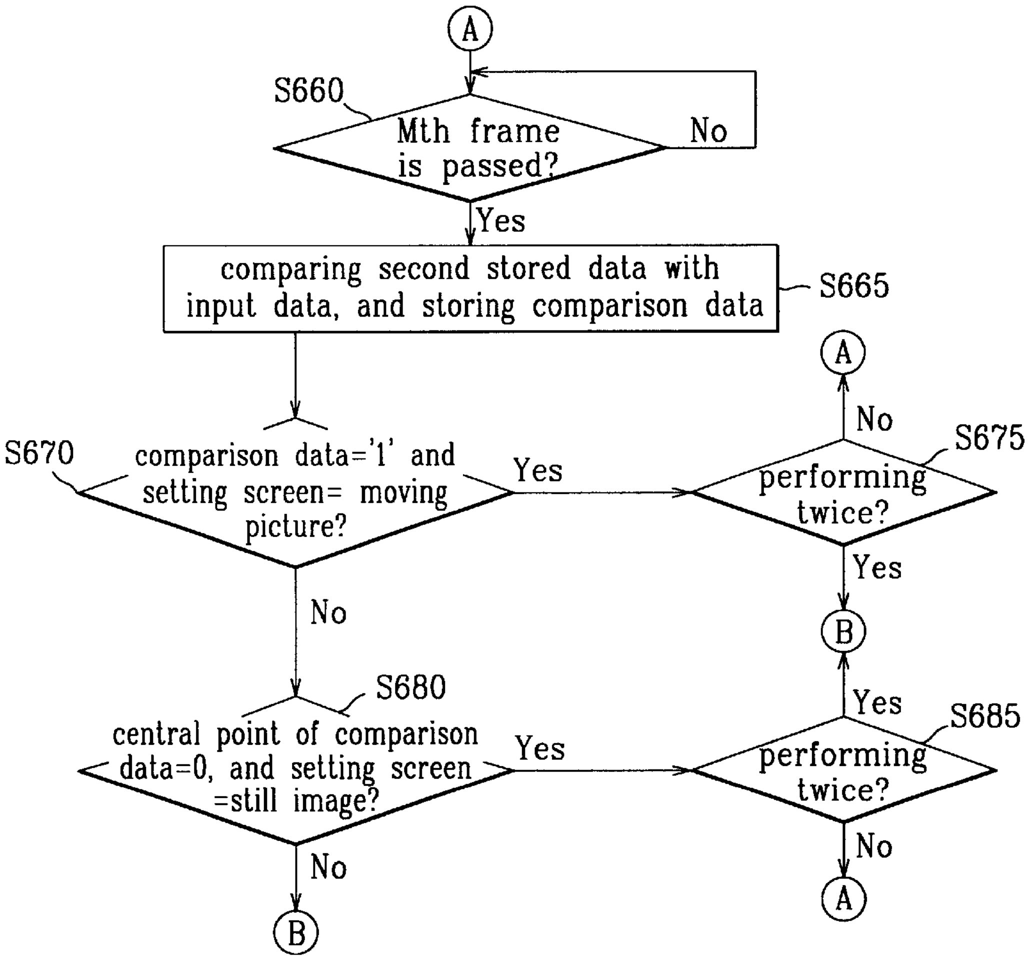

FIGS. 8A and 8B show a flowchart of a driving method of an LCD having an adaptive luminance intensifying function according to the second preferred embodiment of the invention.

A plurality of cells to be displayed on a single frame is established in step S610.

First data extracted from the image data corresponding to the cell of the presently input frame are stored in step S615. In this instance, the first data can be either the data corresponding to nine points or the data corresponding to five points each of which corresponds to one of five points of a cross shape.

It is checked whether an N-th frame is passed in step S620. In the case the N-th frame is passed, second data extracted from the image data corresponding to the cells among the input frame are stored and the first and second data are compared in step S625.

It is checked whether the first and second data are matched in step S630, and when they are found to be matched, ‘0’ is set to be a first comparison datum in step S632, and when they are found to be different, ‘1’ is set to be the first comparison datum in step S634.

It is checked whether output values of horizontal direction comparison data (e.g., three points) are all ‘1’ in step S640, and in the case at least one of them is not ‘1’, it is checked if more than four of the comparison data are ‘1’ in step S645. Here, it is also possible to check output values of vertical direction comparison data as well as the described horizontal ones.

In the case more than four of the comparison data are ‘1’, a mode is set to be a moving picture mode in step S650, and if not, it is set to be a still image mode in step S652, and in the case the output values of the horizontal or vertical direction comparison data are all ‘1’ in step S640, it is set to be the moving picture mode in step S654.

It is checked whether an M-th (a positive integer greater than the N) frame is passed in step S660, and in the case the M-th frame is passed, second storage data and presently input data are compared for the second time, and a second comparison datum is stored in step S665.

It is checked whether the second comparison datum is ‘1’ and the set screen is a moving picture mode in step S670, and when this condition is satisfied, it is checked whether the previous step S670 is performed twice in step S675. When it is checked that the step S670 is performed twice, it goes to the step S615 (see FIG. 8A), and when it is not, it goes to the step S660. Here, the performance times of the step S670 is not restricted to twice.

When the second comparison datum is not ‘1’ or the set screen is not a moving picture mode in the previous step S670, it is checked whether a central comparison datum of the second comparison values is ‘0’ and the set screen is a still image mode in step S680, and when these are satisfied, it is checked whether the previous step S680 is performed twice in step S685. When the previous step S680 is found to have been performed twice, it goes to the previous step S615 (see FIG. 8A), and when the previous step S680 has not been performed twice, it goes to the previous step S660.

As described above, levels of the gray voltages of the R, G and B image data are checked, and when the levels are found to be of high luminance according to the number of the checked gray voltages, the luminance of the backlight is controlled to be increased, and when the level is found to be of low luminance, the luminance of normal level backlight is maintained and concurrently the gray level of low-gray data is converted to implement a high contrast.

That is, the luminance of the backlight is increased in the case of a screen that requires a high contrast ratio or a screen that has all high gray voltages (or requires high luminance), and normal luminance is maintained in other cases so as to increase the contrast of the LCD.

Also, according to the second preferred embodiment, predetermined portions are selected from the display screen, and variations of the image data are tracked and monitored to define the displayed image features, and it is determined whether the method according to the second preferred embodiment is applied to an artificial intelligence (AI) method so as to control the luminance levels of the backlight.

Also, by determining whether the method according to the second preferred embodiment can be applied to an artificial intelligence (AI) method, the outputs of the modified gamma voltage levels can be controlled. The contrast of the display screen can be increased and power consumption can be reduced according to the luminance level control of the backlight and the output control of the modified gamma voltage levels.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) comprising:

an LCD panel comprising a plurality of gate lines, a plurality of data lines, switches connected to the gate lines and data lines, and pixel electrodes connected to the switches and being responsive to operations of the switches;

a scan driver to sequentially output scan signals to the gate lines;

a data driver to output image signals to the data lines;

an inverter to output a predetermined backlight driving voltage;

a backlight unit arranged on a rear portion of the LCD panel to output predetermined rays when a backlight driving voltage is supplied; and a timing controller receiving image signals and timing signals, converting them into signals for outputs of the image signals and scan signals, respectively outputting them to the data driver and the scan driver, checking the image signals, and controlling the inverter such that luminance of the backlight unit is varied depending on the gray voltage levels of the image signals when the image signals represent moving pictures so as to increase or decrease luminance levels of the LCD panel and the luminance of the backlight unit is maintained when the image signals represent.

2. The LCD of claim 1, wherein the timing controller comprises:

an image referrer to check the image signals and outputs image determination signals according to the checked image signals; and a luminance controller to output backlight level control signals to the inverter based on the image determination signals.

3. The LCD of claim 2, wherein the luminance controller further outputs gamma voltage control signals.

4. The LCD of claim 2, wherein the backlight level control signals intensify the luminance when the image determination signals represent moving pictures, and output a predetermined luminance level when the image determination signals represent still images.

5. The LCD of claim 3, wherein the gamma voltage control signals comprises a modified gamma voltage when the image determination signals represent moving pictures.

6. The LCD of claim 3, wherein the LCD further comprises a gamma processor for receiving the gamma voltage control signals and outputting modified gamma voltages to the data driver.

7. The LCD of claim 2, wherein the image referrer comprises:

a storage unit;

a frame counter for extracting first data corresponding to a plurality of cells from image data of a k-th frame provided from the outside, storing the first data, extracting second data corresponding to the cells from image data of a (k+N)th frame (here, N is a positive integer), storing the second data, and outputting the first and second data;

a data comparator for comparing the first data with the second data, and when they are matched, outputting a first signal, and when they are not matched, outputting a second signal; and an image determiner for outputting a first image determination signal for a still image setting when the first signal is input by the data comparator, and outputting either the first image determination signal or a second image determination signal for a moving picture setting when the second signal is input by the data comparator.

8. The LCD of claim 7, wherein when the second signals are input by the data comparator, the image determiner checks, whether output values of comparison data corresponding to a first direction are all the second signals, and when output values are all the second signals, the image determiner outputs the second image determination signal for a moving picture setting, and when one or more of the output values of the comparison data corresponding to the first direction are not the second signals, the image determiner checks whether the number of the second signals of the comparison data is greater than a predetermined integer, and when the number of the second signals is greater than the predetermined integer, the image determiner outputs the second image determination signal for a moving picture setting, and when the number of second signals is less than the predetermined integer, the image determiner outputs the first image determination signal for a still image setting.

9. The LCD of claim 8, wherein the predetermined integer is 4.

10. The LCD of claim 8, wherein the first direction is a horizontal or a vertical direction.

11. The LCD of claim 7, wherein the cells comprise four pixel blocks each of which is provided on crossing lines that equivalently divide a screen of the LCD panel into top, bottom, right and left quarters, and an additional pixel block is provided at the center of the screen.

12. The LCD of claim 11, wherein the cell further comprises:

a first pixel block corresponding to a top left portion of the LCD panel;

a second pixel block corresponding to a top right portion of the LCD panel;

a third pixel block corresponding to a bottom left portion of the LCD panel; and a fourth pixel block corresponding to a bottom right portion of the LCD panel.

13. A method for driving a liquid crystal display (LCD) comprising an LCD module for receiving an LCD panel and a backlight unit, a scan driver for outputting scan signals to the LCD panel, and a data driver for outputting image signals to the LCD panel, the LCD driving method comprising:

(a) setting a plurality of cells;

(b) storing first data respectively corresponding to the cells at a k-th frame input from outside;

(c) storing second data respectively corresponding to the cells at a (k+N)th frame after an N-th frame is passed, comparing the first data with the second data, and when the first data and the second data are matched, setting a first value, and when the first data and the second data are different, setting a second value, and computing a plurality of first comparison values;

(d) setting input images to be a moving picture mode when all the first comparison values are equal to the second value;

(e) checking whether the number of the first comparison values that are equal to the second value is greater than a predetermined integer when one of the first comparison values is not equal to the second value;

(f) setting the input images to the moving picture mode when the number of the first comparison values that are equal to the second value is greater than the predetermined integer, and setting the input images to a still image mode when the number of the first comparison values that are the second value is less than the predetermined integer;

(g) activating an adaptive luminance intensifying function for controlling luminance of the backlight unit according to gray levels of the image data displayed for each image frame when the input images are set to be the moving picture mode, and outputting the image data in the previous steps (d) or (f); and (h) deactivating the adaptive luminance intensifying function and outputting the image data according to a predetermined reference luminance level when the input images are set to be the still image mode in the previous step (f).

14. The method of claim 13, wherein the adaptive luminance intensifying function of (g) comprises:

(g-1) dividing gray data of the input images into at least three gray level groups with respect to a single image frame, said divided groups including a darkest gray level group, a middle gray level group, and a brightest gray level group; and counting image data of R, G and B for each divided gray level group;

(g-2) checking whether a ratio of the data of the brightest gray level group of the divided gray level groups to total image data is greater than a predetermined ratio;

(g-3) checking whether a ratio of the data of the darkest gray level group of the divided gray level groups to total image data is greater than a second predetermined ratio when the ratio of the data of the brightest gray level group of the divided gray level groups to total image data is greater than a the predetermined ratio in (g-2); and increasing the luminance of the backlight unit and converting the gray of low-gray data when the ratio of the data of the darkest gray level group to total image data is greater than the second predetermined ratio.

15. The method of claim 13, wherein the predetermined integer is equal to or greater than 4.

16. The method of claim 13, wherein the LCD driving method further comprises:

(i) receiving first-direction cell data of an input (k+N+M) th frame when an M-th frame is passed, comparing the cell data with the second data, and when they are matched, setting a first value, and when they are different, setting a second value and computing second comparison values;

(j) repeating the step (i) at least once when all the second comparison values are equal to the second values and the input images are set as the moving picture mode, and going to the step (b) when the input images are set as the moving picture mode;

(k) setting a comparison value of a central point among the comparison values to be the first value when the input images are not set as the moving picture mode, and when the input images are set as the still image mode, repeating the step (i) at least once, and when input images are still set as the still image mode, going to the step (b); and (l) going to the step (i) when the input images are not set as the still image mode in the step (k).

17. The method of claim 16, wherein the first direction is a horizontal or a vertical direction.

18. The method of claim 13, wherein when the first and the second data are matched, they are determined to be still images, and when the first and second data are different, they are determined to be moving pictures.

19. The method of claim 13, wherein the cells comprise four pixel blocks each of which is provided on crossing lines that equivalently divide the screen of the LCD panel into top, bottom, right and left quarters, and an additional pixel block is provided at the center of the screen.

20. The method of claim 19, wherein the cell further comprises:

a first pixel block corresponding to a left top portion of the LCD panel;

a second pixel block corresponding to a right top portion of the LCD panel;

a third pixel block corresponding to a left bottom portion of the LCD panel; and a fourth pixel block corresponding to a right bottom portion of the LCD panel.

21. A liquid crystal display (LCD), comprising:

an LCD panel to display images corresponding to gray voltage levels of image signals;

a backlight unit supplying light to the LCD panel; and a controller controlling the backlight unit such that luminance of the backlight unit is varied depending on the gray voltage levels of the image signals when the images are moving pictures and is uniformly maintained when the images are still images.

22. The LCD of claim 21, when the controller compares the gray voltage levels of the image signals in different frames and determines whether the images are the moving pictures or the still images.

23. The LCD of claim 22, wherein the image signals compared by the controller correspond to at least one predetermined portion on the LCD panel.

* * * * *